(12) United States Patent
Pujol

(10) Patent No.: US 11,142,331 B2
(45) Date of Patent: Oct. 12, 2021

(54) LIQUID CONTAINMENT SYSTEM

(71) Applicant: Bell Helicopter Textron Inc., Fort Worth, TX (US)

(72) Inventor: Michael P. Pujol, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 470 days.

(21) Appl. No.: 16/109,368

(22) Filed: Aug. 22, 2018

(65) Prior Publication Data

US 2020/0062415 A1 Feb. 27, 2020

(51) Int. Cl.
*B64D 37/04* (2006.01)
*B64D 37/32* (2006.01)
*B64D 37/30* (2006.01)

(52) U.S. Cl.
CPC ............. *B64D 37/04* (2013.01); *B64D 37/32* (2013.01); *B64D 37/30* (2013.01)

(58) Field of Classification Search
CPC ........ B64D 37/04; B64D 37/06; B64D 37/30; B64D 37/32
See application file for complete search history.

(56) References Cited

U.S. PATENT DOCUMENTS

| 6,149,102 A | * | 11/2000 | Marasco | B64D 37/04 244/135 R |
| 2015/0231966 A1 | * | 8/2015 | Bemis | B32B 33/00 206/524.2 |

OTHER PUBLICATIONS https://www.sei-ind.com/products/bulk-aviation-transport-tank/ (Year: 2021).*

* cited by examiner

*Primary Examiner* — Richard G Davis
(74) *Attorney, Agent, or Firm* — Pramudji Law Group PLLC; Ari Pramudji

(57) ABSTRACT

Various implementations described herein are directed to a liquid containment system. In one implementation, the liquid containment system includes a bladder; an airframe; and a plurality of ties configured to couple the bladder to the airframe.

8 Claims, 5 Drawing Sheets

LIQUID CONTAINMENT SYSTEM

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

FIG. 1 illustrates an example aircraft, e.g., rotorcraft 100, which may include a fuel cell, e.g., a flexible containment device for fuel. This flexible containment device or bladder may be placed within an airframe/chassis/fuselage compartment of the aircraft. The bladder can be removable from the airframe compartment. These bladders are typically installed in the airframe compartment or fuselage using a rope or cord to lace the perimeter of the bladder to the airframe compartment. The airframe compartment controls the shape of the bladder. It is desirable to keep the upper surface of the bladder as high as possible in the airframe compartment. Installing the bladder in this manner maximizes the volume of fuel that can be held by the bladder. As such, when a bladder is installed, the space between the edges of the bladder and edges of the airframe compartment is configured to be as close as possible.

In some instances, a component beneath the bladder needs to be replaced or an inspection of the space beneath the bladder needs to be done. In order for this replacement or inspection to take place, the rope needs to be cut and completely pulled out. In order to re-install the bladder in the airframe compartment, the rope will need to be re-laced. The process of re-installing a previously installed bladder is very time consuming. In addition, the use of a rope or cord does not allow for positioning fittings of the bladder.

SUMMARY

Described herein are various implementations of a liquid containment system. In one implementation, the liquid containment system includes a bladder; an airframe; and a plurality of ties configured to couple the bladder to the airframe.

The bladder may have a plurality of reinforcing eyelets. The airframe may have a plurality of connectors. At least one of the plurality of ties can couple a portion of the bladder to the airframe by coupling one of the reinforcing eyelets of the bladder to a corresponding one of the connectors of the airframe.

The airframe may include an airframe compartment. The plurality of ties may be configured to couple the bladder to the airframe compartment.

In one implementation, one or more of the plurality of ties can be configured to be cut and replaced in order to provide access to a component disposed below the bladder.

In one implementation, each of the plurality of ties can be configured to have a predetermined breaking point.

In one implementation, at least one of the plurality of ties is configured to have a predetermined breaking point such that in a crash condition, the tie will fail before a portion of the bladder corresponding to where the tie couples to the bladder.

Described herein is also a method for adjusting a bladder coupled to an airframe using a plurality of ties. In one implementation, one or more of the plurality of ties is cut to provide access to a component. The one or more of the plurality of ties that were cut to provide access to the component are replaced in order to re-couple the bladder to the airframe.

Described herein is also a method for coupling a bladder to an airframe of an aircraft. A plurality of ties is provided. The bladder is coupled to an airframe of the aircraft using the plurality of ties.

In one implementation, one or more of the plurality of ties can be cut to provide access to a component disposed below the bladder. The one or more plurality of ties that were cut to provide access to the component can be replaced.

In one implementation, an individual tension setting can be applied for each of the plurality of ties.

In one implementation, an individual diameter setting can be applied for each of the plurality of ties.

In one implementation, a tension of each of the plurality of ties can be modified to fit the bladder in a cavity of the airframe.

In one implementation, coupling the bladder to the airframe includes coupling corners of the bladder to the airframe. Remaining portions of the bladder can be coupled to the airframe after coupling the corners of the bladder.

In one implementation, each of the plurality of ties can be configured to have a predetermined breaking point.

The at least one of the plurality of ties can be configured to have a predetermined breaking point such that in a crash condition the tie will fail before a portion of the bladder corresponding to where the tie couples to the bladder.

The above referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
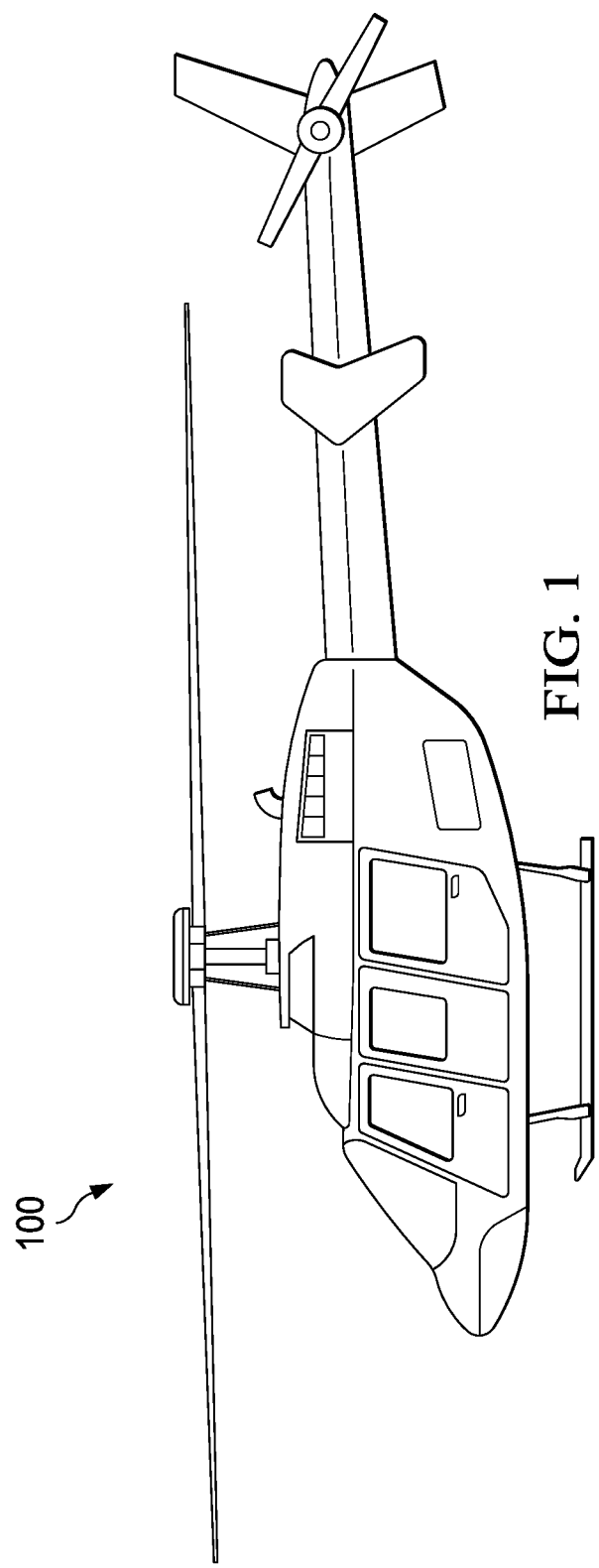
FIG. 1 illustrates an example aircraft in accordance with implementations of various techniques described herein.
Figure 2:
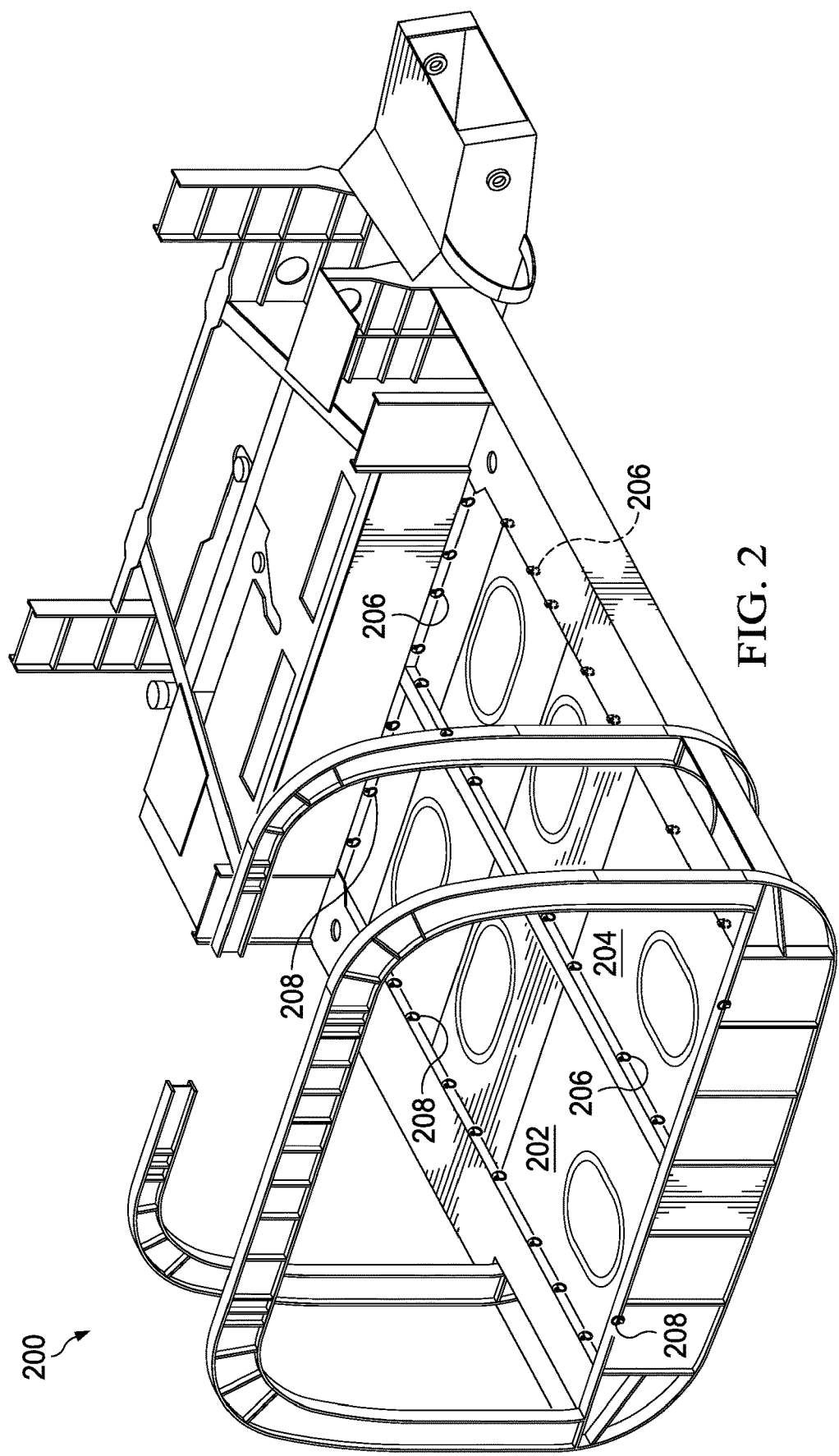
FIG. 2 illustrates an example airframe of an aircraft in accordance with implementations of various techniques described herein.

FIG. 2 illustrates an example airframe of an aircraft. Airframe or fuselage 200 may include one or more compartments capable of accommodating a bladder. In this example, fuselage 200 includes two airframe compartments 202, 204. The airframe compartments 202, 204 include a plurality of loops or connectors 206, 208 located around an interior perimeter of each airframe compartment 202, 204.

Figure 3:
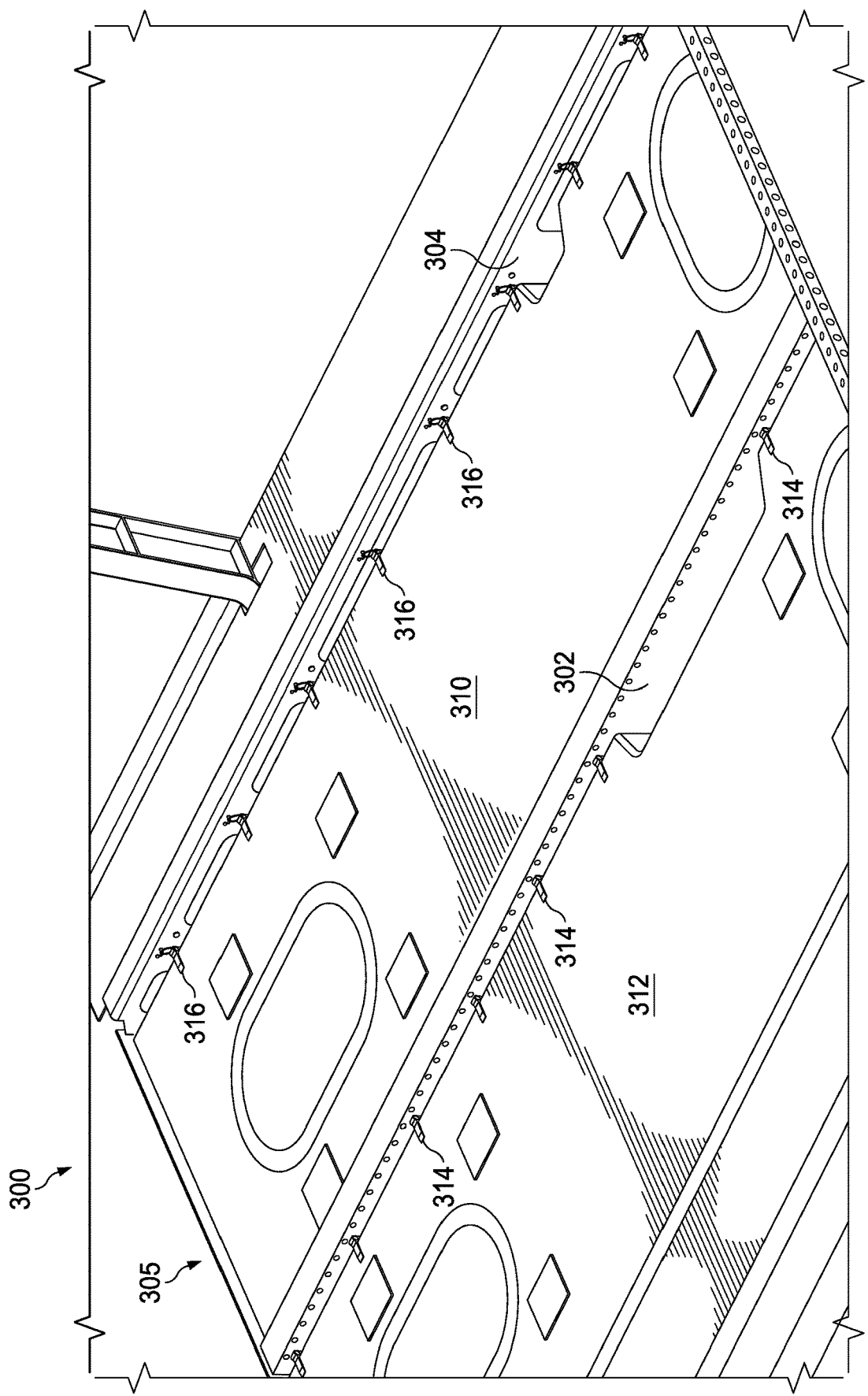
FIG. 3 illustrates an example fuselage incorporating a bladder in accordance with implementations of various techniques described herein.
Figure 4:
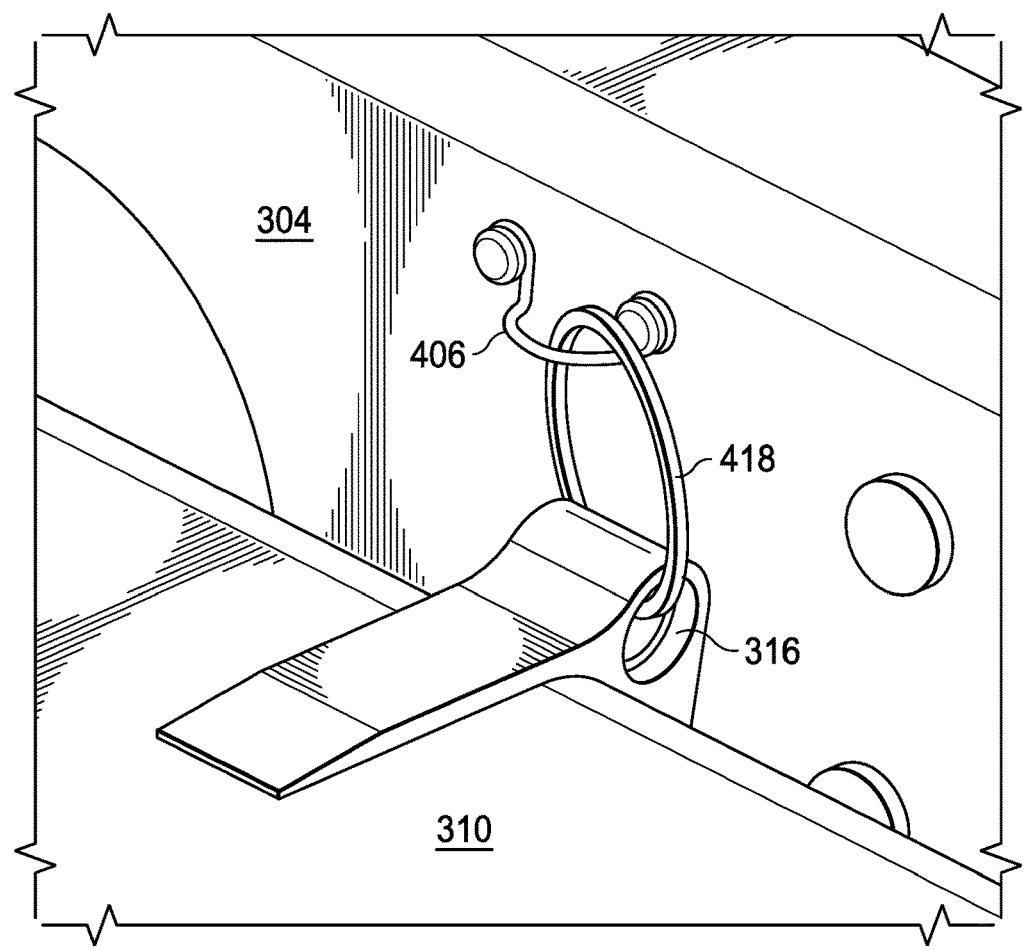
FIG. 4 illustrates coupling of a bladder to an airframe compartment in accordance with implementations of various techniques described herein.

FIG. 3 illustrates a liquid containment system 300 having a fuselage incorporating a bladder contained therein. In this example, fuselage 305 includes two airframe compartments 302, 304. The airframe compartments 302, 304 include a plurality of loops or connectors (not shown) located around an interior perimeter of each airframe compartment 302, 304. Airframe compartment 302 has a bladder 310 disposed therein while airframe compartment 304 has a bladder 312 disposed therein. Each bladder 310, 312 includes a plurality of reinforcing eyelets 314, 316 located around the edges of each bladder 310, 312. Each bladder 310, 312 is installed in each airframe compartment by coupling reinforcing eyelets 314, 316 of each respective bladder to loops or connectors of each airframe compartment. The eyelets are illustrated in FIG. 4 and described below. Bladder 310, 312 may also be referred to as a flexible bladder, fuel cell, fuel tank, and/or a bag. Bladder 310, 312 may be used in a fuel containment system or another liquid containment system. For example, bladder 310, 312 may be configured to hold water, pesticide, fuel or any other liquid.

FIG. 4 illustrates coupling bladder 310 to airframe compartment 304. Airframe compartment 304 includes a loop or connector 406 that is coupled to reinforcing eyelet 316 of bladder 310. Reinforcing eyelet 316 is coupled to connector 406 using a tie 418.

In one implementation, bladder 310, 312 may be coupled to any airframe compartment 304 of an aircraft in a horizontal configuration (as shown in FIG. 3) or in a vertical configuration. In one implementation, bladder 310, 312 can be coupled to a portion of a bottom/floor surface of an aircraft.

Figure 5:
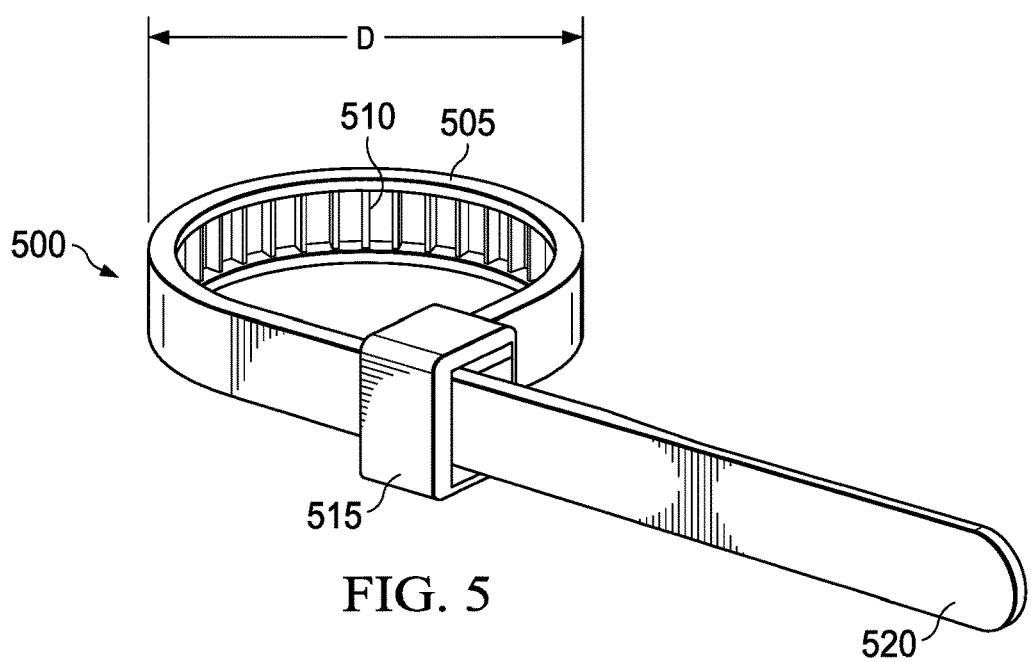
FIG. 5 illustrates an example tie in accordance with implementations of various techniques described herein.

FIG. 5 illustrates an example tie. Tie 500 includes a flexible section 505 with teeth or serrated grooves 510 that engage with a pawl (not shown) in the head 515 to form a ratchet so that as the free end 520 of the tie 500 is pulled, the tie 500 tightens and does not come undone. In one implementation, a tab (not shown) can be used such that when the tab is depressed the ratchet is released and the tie can be loosened or removed. In other implementations where a tab is not used, the tie 500 can be cut in order to remove the tie.

Tie 500 may be an aerospace grade tie that is similar to a cable tie, e.g., a wire tie, hose tie, steggel tie, zap strap or zip tie. An aerospace grade tie is a tie that is adapted for use in aerospace applications. Tie 500 may be made of nylon, plastic, or metal. In one implementation, a metal version of tie 500 may be coated with rugged plastic.

Figure 6:
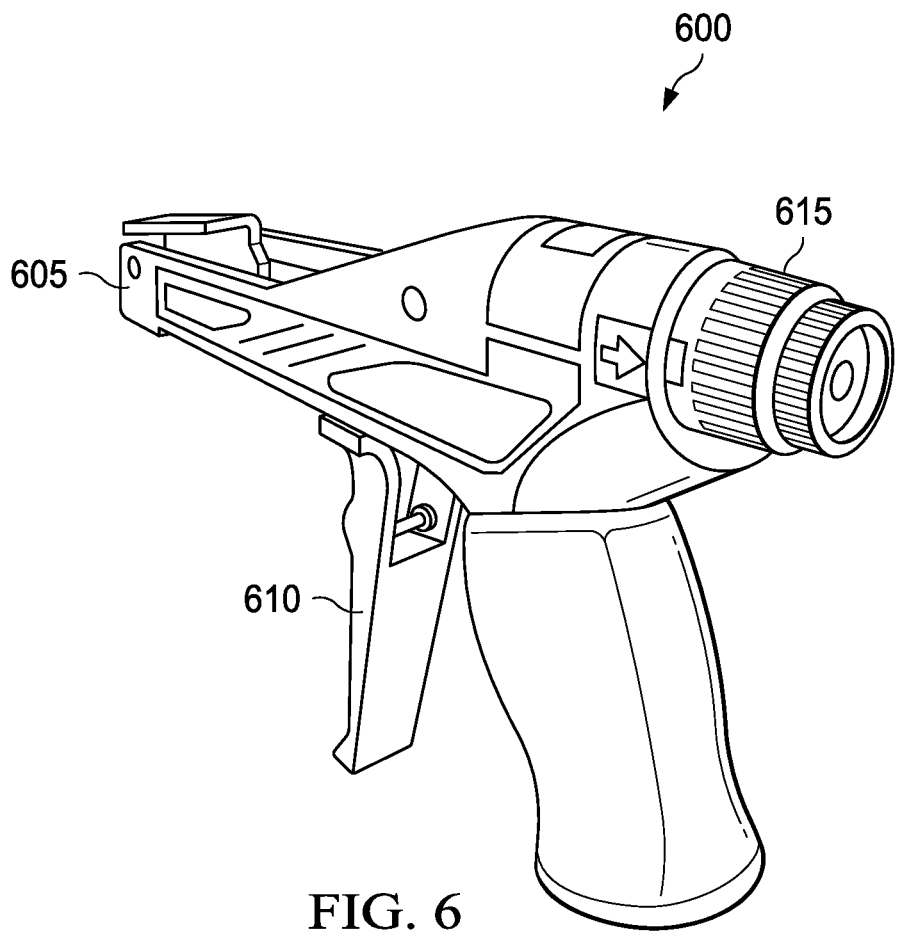
FIG. 6 illustrates an example tie tensioning device or fastener in accordance with implementations of various techniques described herein.

FIG. 6 illustrates an example tie tensioning device or fastener. A tie can be installed using tie tensioning device or fastener 600. Tie tensioning device 600 includes a ratchet 605 and a trigger handle 610. The trigger handle 610 is actuated by an operator to use the ratchet 605 to tighten a tie, e.g., tie 418, 500. A desired tension setting for the tie can be set using adjusting knob 615. In one implementation, the tie tensioning device may cut off the free end 520, e.g., the "tail" of the installed tie, flush with the head 515.

In accordance with various techniques/technologies described herein, each eyelet 314, 316 of the bladder 310, 312 may be individually coupled to connector 406 of the airframe compartment 302, 304 using a tie 418, 500. In some instances where a component below the bladder 310, 312 in the airframe compartment needs to be changed or inspected, only one or more ties 418, 500 above the component may need to be cut. Once the component is changed or inspected, the tie(s) 418, 500 that were removed or cut can be quickly and easily replaced.

In one implementation, a tension of the tie tensioning device can be preset. In this way, the tension of each tie 418, 500 can be individualized or customized based on the distance or proximity between the eyelet 316 and its respective connector 406. Further, the diameter (e.g., D of FIG. 5) of each tie 418, 500 can be individualized or customized based on the distance or proximity between the eyelet 316 and its respective connector 406. With these advantages, each coupling between an eyelet 316 and its respective connector 406 may be individualized or customized, thereby allowing the bladder 310, 312 to be held tightly against the airframe compartment 202, 204.

Using ties 418, 500 in accordance with various implementations described herein, installing a bladder 310, 312 can be quicker and more flexible. In addition, the tension of the ties 418, 500 coupling the bladder 310, 312 to the airframe compartment 202, 204, 302, 304 can be modified or fine tuned depending on how the bladder 310, 312 is fitting into the cavity.

In one implementation, ties 418, 500 for corners of the bladder 310, 312 can be installed first. Then the other remaining ties 418, 500 can be installed afterward.

In one implementation, the ties 418, 500 can provide crash worthiness and/or crash resistance features. Each of the ties 418, 500 can be set to handle a certain load or set to have a particular breaking/fracture point. In another implementation, the breaking/fracture point of the tie 418, 500 can be selected using a load rating of the tie 418, 500. During a drop test or a crash, the ties 418, 500 can break and allow the bladder 310, 312 to deform. In this manner, the ties 418, 500 can be used as a mechanical fuse to keep the reinforcing eyelet from being ripped away from the bladder 310, 312 and causing a leak.

Figure 7:
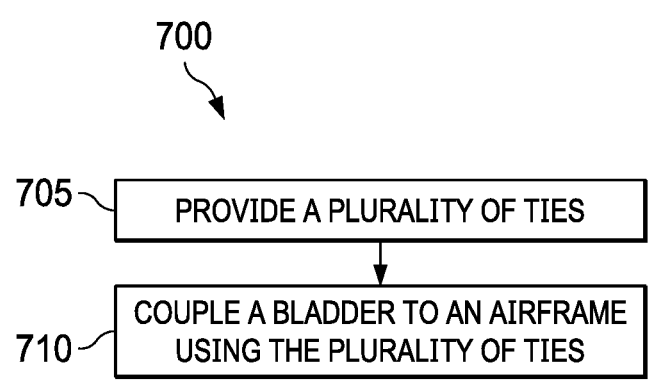
FIG. 7 illustrates a block diagram of a method for coupling a bladder to an airframe in accordance with implementations of various techniques described herein.

FIG. 7 illustrates a block diagram of a method 700 for fastening a bladder to an airframe. At block 705, a plurality of ties, e.g., tie 418, 500, is provided. At block 710, a bladder, e.g., bladder 310, is coupled to an airframe compartment, e.g., airframe compartment 304, using the plurality of ties, e.g., tie 418. The bladder 310 is coupled to the airframe compartment 304 by coupling reinforcing eyelets, e.g., eyelet 316 of the bladder 310, to connectors, e.g., connector 406, of the airframe compartment 304.

In one implementation, after the bladder 310 is coupled to the airframe compartment 304 a further step of method 700 may include providing access to the airframe component. In order to provide access to the airframe compartment, e.g., to change or inspect a component, one or more ties 418, 500 may be cut or removed. Once the component is changed or inspected, the tie(s) that were removed can be quickly and easily replaced or reinstalled.

In one implementation, when the bladder 310 is being coupled to the airframe component 304 at block 710, an individual tension or diameter (e.g., diameter D of FIG. 5) setting can be applied for each tie (e.g., tie 418) at each eyelet (e.g., eyelet 316) to connector (e.g., connector 406)

coupling location. In one implementation, the tension of the ties 418, 500 coupling the bladder 310, 312 to the airframe compartment 202, 204, 302, 304 can be modified or fine tuned depending on how the bladder 310, 312 is fitting into the cavity (e.g., airframe compartment 302, 304).

In one implementation, ties for corners of the bladder can be installed first. Then the other remaining ties can be installed afterward.

In one implementation, a further step of method 700 may include using the ties to provide crash worthiness and/or crash resistance features. As described above, each of the ties 418, 500 can be set to handle a certain load or set to have a particular breaking/fracture point and/or to act as a mechanical fuse.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A liquid containment system, comprising:
a bladder;
an airframe having an airframe compartment within a floor of the airframe and containing the bladder; and
a plurality of ties configured to couple the bladder to the airframe.

2. The liquid containment system of claim 1, wherein the bladder has a plurality of reinforcing eyelets.

3. The liquid containment system of claim 1, wherein the airframe has a plurality of connectors located around an interior perimeter of the at least one bladder receiving compartment.

4. The liquid containment system of claim 3, wherein at least one of the plurality of ties couples a portion of the bladder to the airframe by coupling one of the reinforcing eyelets of the bladder to a corresponding one of the connectors of the airframe.

5. The liquid containment system of claim 1, wherein the plurality of ties is configured to couple the bladder to the airframe compartment.

6. The liquid containment system of claim 1, wherein: one or more of the plurality of ties is configured to be cut and replaced in order to provide access to a component disposed below the bladder.

7. The liquid containment system of claim 1, wherein each of the plurality of ties is configured to have a predetermined breaking point.

8. A liquid containment system, comprising:
a bladder; an airframe; and a plurality of ties configured to couple the bladder to the airframe;
wherein at least one of the plurality of ties is configured to have a predetermined breaking point such that in a crash condition the tie will fail before a portion of the bladder corresponding to where the tie couples to the bladder.

* * * * *